Jan. 7, 1930. G. E. SWARTZ 1,742,224
JIG DEVICE
Filed April 12, 1926

Inventor
Guy E. Swartz
By
C. F. Heinkel,
Attorney

Patented Jan. 7, 1930

1,742,224

UNITED STATES PATENT OFFICE

GUY E. SWARTZ, OF DETROIT, MICHIGAN

JIG DEVICE

Application filed April 12, 1926. Serial No. 101,362.

My invention relates to jig means for holding objects generally and to the clamping means for such jig means particularly.

The predominating objects of my invention are:—
(a) a simple and efficient jig means for producing accurate work;
(b) efficient clamping of objects;
(c) efficiently clamping more than one object in one clamping operation;
(d) efficiently clamping a plurality of objects successively with substantially the same clamping pressure;
(e) to reduce distortion in the objects due to the clamping thereof;
(f) to prevent the tilting of the clamping member;
(g) to reduce the cost of the production of jig devices.

As is well known in the art, a jig or other similar devices are used to increase production and to promote the accuracy of work or operations performed. A jig or other similar devices should hold pieces to be operated on successively so that there is no need to set up each piece of work separately.

Various devices, and improvements thereon, have been devised with varying degrees of success.

In the usual jig devices the pieces are not held with equal pressure since the source of power which creates the pressure is either unstable or is applied in a manner which does not take into account that the pieces vary in size and that a locally fixed pressure does exert a varying pressure on the differently sized pieces. This varying pressure, naturally, clamps the pieces to a support with varying force and this varying force either distorts the pieces themselves or holds them in various different relations to the spacing or locating or support means of the jig device.

Under the conditions mentioned, after the pieces are operated upon and released from the jig device, the pieces spring back into normal form and this springing back to form usually distorts the operation performed while the pieces were inefficiently clamped in the jig device results in inaccurate work.

In the usual jig devices, the clamping operation is performed by manually operated means. This is highly disadvantageous since no operator will operate the clamping means with the same force all day long and day after day; that is humanely impossible; therefore, a jig device, or other similar devices, which depend upon manual operation for clamping purposes, are not reliable either as to accuracy or as to actual clamping.

In the usual jig devices, where one member moves in relation to another member and the moving member is the clamping member as well as the tool guiding member, as is usually the case, the moving means for the moving member tilts the same. This is highly disadvantageous since a tilted tool guide does not guide a tool properly and the operation on the piece of work is not performed in its true or desired relation to the support of the piece or to the piece itself. This tilting and the disadvantageous clamping mentioned constitute double disadvantages found in the usual jig devices or other devices of a similar nature.

To illustrate the above:—if the movable member in Fig. 2 of the accompanying drawing could tilt so that the drill bushing therein would be tilted also, the drill would follow the drill bushing and would drill a hole through the piece of work at an angle to what it was intended to be drilled. Or, if the clamping, done by the movable member, was operated by an unstable power means, such as a manual operation, no two successively clamped pieces would be clamped with the same force and more or less distortion would thereby be created in the pieces of work. Even if the movable member was not tilted by such clamping and the drill did produce accurate work as related to the jig device, the piece operated upon would spring back to its original form when it is released from the device and the hole drilled will not be in proper relation in the piece although the piece had been properly located in the device. In such instances, particularly when the hole is also reamed to accurate size while it is in the device, as is usually the case, the springing back to original form of the piece after its release, usually distorts the wall of the hole also and re-reaming or another corrective operation is necessary to bring the work up to a required accuracy.

Either one of the above disadvantages is detrimental to efficiency and both combined are doubly so.

In devices of the kind under consideration it is necessary that members move in relation to each other and that these moving members must move accurately so that such devices produce good work.

In the prior art, the members are machined and fitted accurately which requires considerable time and labor and affords no ready means for adjusting the members when adjustment is necessary or desirable as, for instance, after parts wear or when work is changed.

The present invention provides adjustment between the members to afford a ready means of adjusting the device to various degrees of operation and to various pieces of work and also provides adjustment between the portions of members to afford a ready means for adjusting the portions to fit accurately to other members and thereby reduces the cost of production of such devices.

The present invention employs all of the advantageous features found in prior jig or other similar devices and adds thereto certain features to eliminate distortion of the work operated upon and to prevent the tilting of the clamping or of the tool guiding members and makes certain parts and portion of parts adjustable to reduce the cost of production of such devices; all combining individually or conjunctly to produce accurate work in an efficient manner and to minimize the cost of such devices and to afford a means for adjustment to meet various conditions or changes as they arise either in the production of the devices or in the use of the devices.

My invention is illustrated in the accompanying drawing, previously referred to, wherein the various inventive features are embodied in two views, in certain combination and construction and arrangement of elements, but I do not limit myself to the combination or construction or arrangement so shown since I am aware that changes in structure and in the arrangement and combination of elements may be made within the scope of the appended claims.

In the accompanying drawing, previously mentioned:

Figure 1:
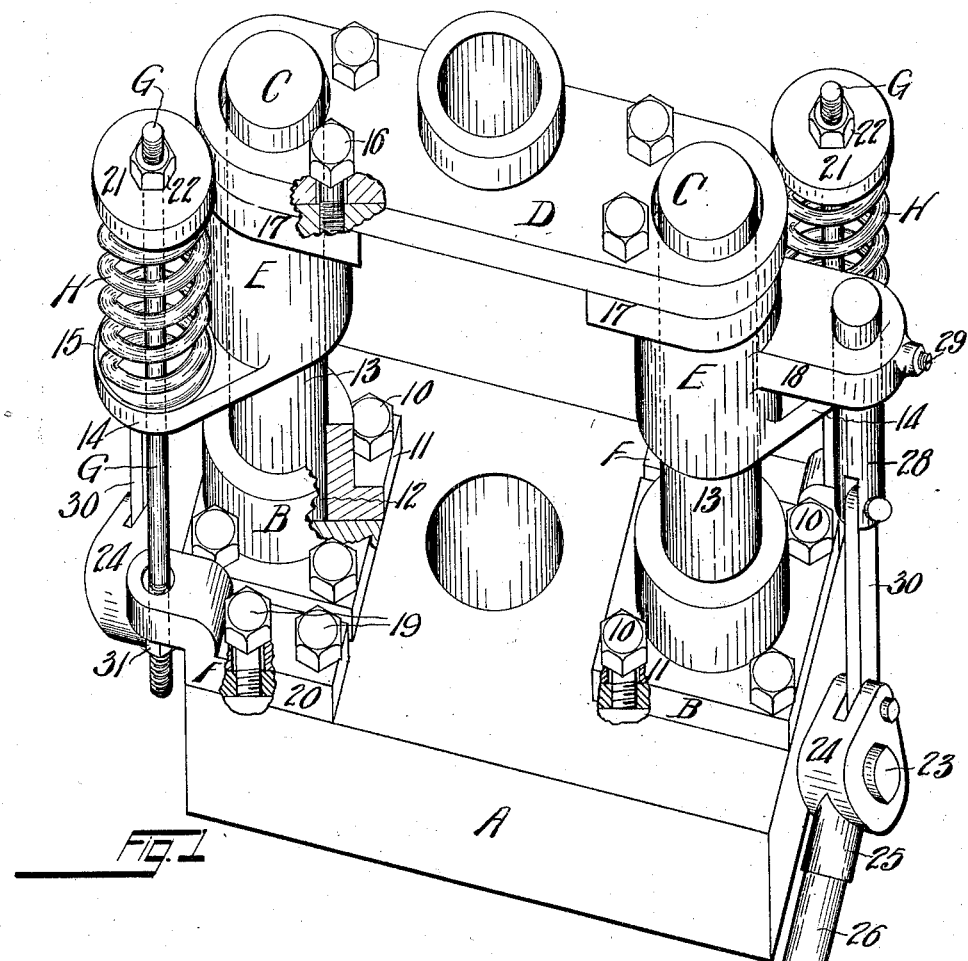
Fig. 1 is a perspective view of a drill jig, embodying the features of my invention, portions thereof broken away to more clearly show relations and structure of parts, and showing the adjustable guide means and the adjustable spring means and the sleeves on the movable member and the movable member held in inoperative position.

Referring now particularly to Fig. 1 of the drawing:—

The base A may be made of any suitable form or material.

The brackets B, two in the present instance, rest on the top of the base A and can be moved thereon laterally for the purpose of lateral adjustment. The screws 10 extend through the flanges 11 of the brackets and are threaded into the base. The holes through the flanges 11, through which the screws 10 pass, are larger than the diameter of the body of the screws to permit each of the brackets to be moved laterally, for the purpose of lateral adjustment of the brackets, within the scope of the difference in size between the screw holes in the flanges and the body of the screws.

Each of the guide means, in the present instance the posts C, two in the present instance and cylindrical, have the lower end 12 thereof driven tightly into the respective of the brackets in the present instance and the other end 13 thereof extends upwardly from the base.

The movable member D may be made of any suitable form or material and is shown in the drawing without any work engaging means and without any special tool guiding means and telescopes over both of the posts C without fitting thereon.

The body portion of the sleeves or connector members E fit slidably over the respective of the posts C and are secured to the under side of the member D by means of the screws 16 which pass through openings in the member D which openings are larger than the diameter of the body of the screws 16 to permit of lateral adjustment of the sleeves on the member D. Each of the sleeves E has the ear 17 abutting the member D and is threaded for the screws 16. Each of the sleeves E has the shelf 14 with the spring guide flange 15 and the lug 18 for the purpose appearing presently.

The brackets F, two in the present instance, rest on the base and can be moved laterally on the base for the purpose of lateral adjustment. The screws 19 are threaded into the base and pass through openings in the flange 20 which openings are larger than the diameter of the body of the screws 19 to permit of lateral adjustment of the brackets F.

It is noted here that the bracket F on the left hand side of Fig. 1 is located in front of the post C on that side and that the bracket F on the right hand side of Fig. 1 is located in the rear of the post C on that side for equalizing purposes as will appear presently.

Each of the bars G, two in the present instance, extends through the respective of the brackets F and through the respective of the shelves 14. In the present instance, each end of the bars G is threaded for adjustment purposes as will appear presently.

The washers 21 are slidable on the upper portion of the respective of the bars G and are held onto the bars, in one direction, by the nuts 22 threaded to the upper end of the bars.

The power means, in the present instance the springs H, two in the present instance, are telescoped over the respective of the bars G in the present instance and have one end thereof abutting on the respective of the shelves 14 and the other end thereof abutting the respective of the washers 21.

The shaft 23 is journaled in the base A in the present instance.

To each end of the shaft 23 is secured the crank 24, both cranks rotating with the shaft. One of the cranks has the socket 25 for the reception of the operating bar 26 which carries the operating handle 27.

A rod 28, cylindrical in the present instance, extends slidably through each of the lugs 18 and is held against sliding in the lug by means of the screws 29.

The links 30 operatively connect the rods 28 to the cranks 24, respectively.

It is noted here that Fig. 1 shows the cranks 24 and the rods 28 and the links 30 all in alignment and that the member D is thereby automatically held in open or inoperative position by this alignment when the operating handle is moved to a position where such alignment is effected.

As previously mentioned, one of the springs H is disposed in front of the corresponding posts C and the other spring H is disposed in the rear of the corresponding post; both springs being located or disposed away from the posts as clearly shown in the drawing.

One of the objects of the present invention is to prevent the tilting of the member D. The sleeves guide the member D on the posts and thereby prevent such tilting to a certain extent. The springs move the member D longitudinally on posts. If the springs act on the member D in a manner to tilt the member D, the sleeves will bind on the posts and either retard or completely arrest the movement of the member D even if the fit between the sleeves and the posts did permit of any appreciable amount of tilt.

In order to construct the device as compact as possible, the spring on the right hand side of Fig. 1 is placed in the rear of the adjacent post to make room for the operating mechanism for the member D. In order to prevent the springs from tilting the member D, the spring on the left hand side of Fig. 1 is placed in front of the adjacent post so that both springs act conjointly to move the member D only in alignment with the posts without producing any tilting tendency in the member D. The lugs 18 are also located so that the operating mechanism does not tilt the member D.

As to general operation:—

The brackets B may be adjusted laterally on the base due to the difference in size between the holes in the brackets and the diameter of the screws 10 to laterally adjust the posts C individually or conjunctly to accommodate the member D, or to accommodate changes made desirable or advantageous either by the action of the springs H or by changes in the object held in the device, or to promote reduced expense of production of the parts and the device and to afford a ready means for correcting inaccuracies arising in the construction of the parts.

The sleeves E may be adjusted laterally on the member D due to the difference in size between the holes in member D and the diameter of the screws 16 to laterally adjust the sleeves to fit to the posts C to promote reduced expense of construction of the parts of the device and to afford a ready means for correcting inaccurate construction of the parts and for adjusting the member D to the posts when the posts are adjusted.

The brackets F may be adjusted laterally on the base due to the difference in size between the holes in the brackets and the diameter of the screws 19. This adjustable feature permits of adjusting the springs H laterally in relation to the posts and to each other and to work held in the device so that the springs act on the member D in such a manner that no tilting of the member D results and that the sleeves do not bind on the posts.

The bars G can be adjusted longitudinally by means of the nuts 31 to move the springs H bodily toward or away from the shelves 14 and thereby permit the springs to be adjusted to various sizes of objects on the base.

The tension of the springs H can be adjusted by means of the nuts 22 to create a desired pressure on the shelves 14. Each of the springs is adjustable independently of the other spring and adjustment can be made so that one spring exerts more pressure on the member D than the other.

This adjustment of the tension of the springs permits the same to be adjusted so that any desired degree of pressure can be attained within the scope and of the springs and the adjustment thereof. This adjustment feature permits of varying the pressure exerted upon either a plurality of similar objects successively held in the device or of varying the pressure exerted upon differently formed objects held in the device or of varying the pressure to prevent distortion of objects held in the device.

One of the outstanding features of the present invention is a self clamping device. The springs effect the clamping. The adjustable feature of the springs affords various degrees of clamping effect and thereby affords a means of preventing distortion in the objects held in the device. This self clamping feature eliminates all errors of clamping made by manual means of clamping since the power means which does the clamping, the springs H in the present instance, exert the same pressure at each clamping operation and thereby hold each of the objects, successively placed into the device, with the same force or pressure.

The shaft is rotated by means of the handle. The rods 28 are secured to the sleeves by means of the screws 29 in the present instance. When the handle is moved forwardly and downwardly, the cranks move the rods longitudinally and upwardly through the links and the sleeves with the member D thereon are thereby moved upward. This upward movement of the movable member D may be carried to a point where the rods and the links are in alignment with the cranks to lock the movable member in inoperative position as previously described. When the handle is released and the alignment mentioned is destroyed, the springs automatically move the movable member D toward the base; thereby effecting the clamping operation by means of the springs or other power means of a constant source, adjustable or otherwise, as distinguished from the necessarily varying manual source.

The sleeves E, and consequently the member D, are adjustable on the rods 28 by means of the screws 29 so that the member D can be adjusted in relation to the base to suit variously sized pieces of work or objects and thereby adapt the device to accommodate such various objects by merely changing adapters and clamping members (as N and O in Fig. 2 for instance) and adjusting the sleeves on the rods 28 to suit the new condition.

Figure 2:
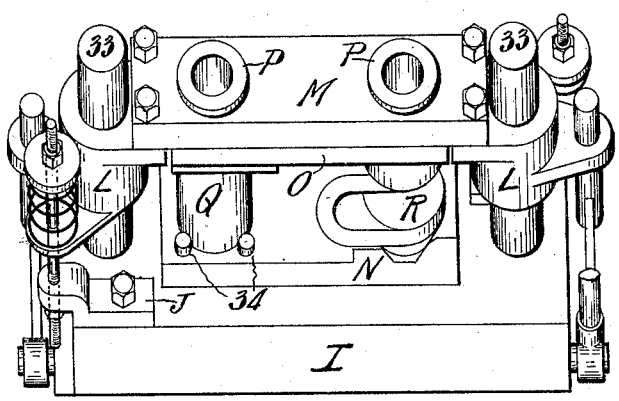
Fig. 2 is a perspective view of a drill jig, embodying the features of my invention, portions thereof broken away to more clearly show relations of parts, and showing a means for holding a plurality of objects and the guide means fixed in the base and adjustable spring means and the movable member in operative position.

Referring now particularly to Fig. 2 of the drawing:—

The base I may be made of any suitable form or material.

The guide means, the posts 33 in the present instance, have one end thereof driven tightly into the base in this instance and the other end thereof extends upward from the base.

The brackets J are similar to and answer the same purpose as the brackets F in Fig. 1.

The springs K are mounted similar to the springs H in Fig. 1 and for the same purpose and the sleeves L are mounted similar to and for the same purpose as the sleeves E in Fig. 1.

The operating mechanism for the movable member M is similar to and for the same purpose as the operating mechanism for the member D in Fig. 1.

In this illustration of my invention I have shown, in addition to the matter shown in Fig. 1, the supporting or locating member N on the base I, the contact member O on the movable member M, and the guide bushing P.

The work Q has a flat bottom resting on the member N and is located by the pins 34. The work R also has a flat bottom resting on the member N and is located by the bevel sides thereof as shown.

The work Q is substantially solid and does not distort easily while the work R is not so solid and is easily distorted. In this instance, the tension of the springs K may be adjusted so that the member O exerts less pressure on the work R than it does on the work Q.

This Fig. 2 illustrates a manner of holding work and of holding different kinds of work.

In both illustrations shown in the drawing, the springs or power means are located to move the movable members so that they will not be tilted; the power means is constant at each operation of the movable members so that each piece of work is clamped with the same force when the same are successively placed into the device; the force exerted by the power means is adjustable to suit varying pieces of work; the power means is located to prevent the tilting of the movable member; the power means is adjustable bodily to meet tilting tendencies which may arise with varying pieces of work or with inaccurate construction of the parts of the device when first made or by wear; the movable member is automatically held in inoperative position to prevent the danger of the movable member moving down to clamping position while an operator may have his hand inside of the device or at other inconvenient times; and the members of the device are constructed so that each is adjustable in relation to other members and so that portions of members are adjustable in relation to other portions and thereby eliminate accurate machining and fitting of the members and afford a ready means for adjusting the members or the portions thereof so that a better device is produced with less cost than was possible prior to the present invention.

I claim:—

1. A device of the character described including a pair of spaced guides having the longitudinal axes thereof in one plane, a member movable on said guides in said planes, a spring located adjacent to and forwardly of one of said guides and of said plane, a spring located adjacent to and rearwardly of the other one of said guides and of said plane, both of said springs co-acting symmetrically about the axis of said plane to move said movable member evenly and in line with said plane in one direction, and means for moving said movable member in the opposite direction.

2. A device of the character described including a pair of spaced guides having the longitudinal axes thereof in one plane, a member movable on said guides in said plane, a spring located adjacent to and forwardly of one of said guides and of said plane, a spring located adjacent to and rearwardly of the other one of said guides and of said plane, both of said springs co-acting symmetrically about the axis of said plane to move said movable member evenly and in line with said plane in one direction, and a mechanism located adjacent to and forwardly of said rearwardly located spring and adapted to move said movable member in the opposite direction.

3. A device of the character described including a pair of spaced guides having the longitudinal axes thereof in one plane, a member movable on said guides in said plane, a spring located adjacent to and forwardly of one of said guides and of said plane, a spring located adjacent to and rearwardly of the other one of said guides and of said plane and spaced the same distance adjacently and rearwardly from said other guide as the first said spring is spaced adjacently and forwardly from said one guide and the same distance rearwardly from said plane as the first said spring is spaced forwardly of said plane, both of said springs co-acting to move said movable member in one direction, and means for moving said movable member in the opposite direction.

4. A jig device including a guide, a clamp member, a spring to move said clamp member in one direction, means for moving said clamp member in the opposite direction, and a connector member having a body portion movable on said guide and a shelf portion abutting one end of said spring and extending sidewise from one end of said body portion and an ear portion abutting said clamp member and extending sidewise from the other end of said body portion and a lug portion engaging said opposite moving means and extending sidewise from said body portion intermediate said shelf and ear portions.

5. A device of the character described including a base, a pair of guides adjustably mounted on said base, a connector member movable on each of said guides, a clamp member adjustably mounted on both of said connector members, a spring abutting each of said connector members, a pair of brackets adjustably mounted on said base and each having a hole through the same, a bar extending through each of said holes and having lateral clearance therein and extending through to corresponding one of said springs, a nut threaded onto one end of each of said bars and abutting the corresponding one of said brackets to vary the longitudinal relation of said bars to said brackets, and a nut threaded onto the other end of each of said bars to vary the tension of said springs.

6. A device of the character described including a base and a guide thereon, a movable member having a sleeve guided on said guide and having a laterally extending shelf with a hole through the same, a bracket on said base and having a hole through the same in alignment with said hole through the shelf, a bar extending through both of said holes, a spring over a portion of said bar and one end thereof resting on said shelf, a washer on the other end of said spring, a nut threaded onto one end of said bar and abutting said washer to adjust the tension of said spring, a nut threaded onto the other end of said bar and abutting the underside of said bracket to adjust the position of said spring according to a desired position of said movable member on said guide.

7. A device of the character described including a base and a guide thereon, a movable member having a sleeve guided on said guide and having a laterally extending shelf with a hole through the same, a bracket resting on and positionally secured to said base by a screw having more than the usual clearance in a hole in said bracket to permit said bracket to be shifted positionally on said base, a bar extending through said hole in the shelf and through said bracket and having a washer near one end thereof, a spring over said bar and between said shelf and said washer, and a nut threaded onto each end of said bar.

8. A device of the character described including a base, a bracket adapted to be shifted positionally on said base, a guide fixed in said bracket, a movable sleeve guided on said guide and having a shelf, a member on said sleeve and movable therewith and clearing said guide and adapted to be shifted positionally on said sleeve and to be secured thereon in shifted position, a bracket on said base, a bar extending floatingly through said bracket and said shelf and having a washer, a spring over said bar and between said washer and said shelf to move said sleeve and said member thereon in one direction, a nut threaded onto one end of said bar and abutting said bracket to vary the position of said spring, a nut threaded onto the other end of said bar to adjust the tension of said spring, and means for moving said sleeve and said member in the opposite direction.

In testimony of the foregoing, I affix my signature.

GUY E. SWARTZ.